United States Patent
Döbbeling et al.

[11] Patent Number: 6,067,789
[45] Date of Patent: May 30, 2000

[54] METHOD AND APPLIANCE FOR OPERATING A GAS TURBINE INSTALLATION COMBUSTION CHAMBER WITH LIQUID FUEL

[75] Inventors: Klaus Döbbeling, Windisch; Lothar Reh, Zumikon; Yunhong Wang, Zürich, all of Switzerland

[73] Assignee: ABB Research Ltd., Zurich, Switzerland

[21] Appl. No.: 09/074,312

[22] Filed: May 8, 1998

[30] Foreign Application Priority Data

May 9, 1997 [DE] Germany .................. 197 19 197

[51] Int. Cl.[7] .................................................. F23R 3/30
[52] U.S. Cl. ........................ 60/39.05; 60/39.59; 60/736
[58] Field of Search .......................... 60/39.05, 39.58, 60/39.59, 736

[56] References Cited

U.S. PATENT DOCUMENTS

| | | |
|---|---|---|
| 1,757,023 | 5/1930 | Smith . |
| 4,731,989 | 3/1988 | Furuya et al. .................. 60/39.05 X |
| 5,048,284 | 9/1991 | Lywood et al. . |
| 5,095,693 | 3/1992 | Day ............................... 60/39.05 X |
| 5,394,685 | 3/1995 | Kesten et al. . |
| 5,617,716 | 4/1997 | Schreiber et al. .............. 60/39.05 X |

FOREIGN PATENT DOCUMENTS

| | | |
|---|---|---|
| 0321809B1 | 6/1989 | European Pat. Off. . |
| 0670418A1 | 9/1995 | European Pat. Off. . |
| 2577990 | 8/1986 | France . |
| 1686032 | 10/1954 | Germany . |
| 2350658 | 5/1974 | Germany . |
| 4003210A1 | 8/1991 | Germany . |
| 4109304A1 | 9/1992 | Germany . |
| 4439619A1 | 5/1996 | Germany . |
| 19520292A1 | 12/1996 | Germany . |
| 07119490 | 5/1995 | Japan . |

OTHER PUBLICATIONS

Heizol–Handbuch fur Industriefeuerungen, Hansen, 1959, pp. 84–85, No Translations English Abstract.

"Low–polluting oil–vapor engine", Forster, Institut fur Chemische Technologie publication No Translations English Abstract.

*Primary Examiner*—Timothy S. Thorpe
*Assistant Examiner*—Ehud Gartenberg
*Attorney, Agent, or Firm*—Burns, Doane, Swecker & Mathis, L.L.P.

[57] ABSTRACT

The object of the invention is to produce a method, for operating a gas turbine installation combustion chamber with liquid fuel, by means of which the $NO_x$ figures obtained when liquid fuel is employed are similar to those for gaseous fuels. The size of the burner is then also reduced. It is also an object of the invention to provide a corresponding appliance for carrying out the method.

This is achieved in accordance with the invention in that the liquid fuel (38) is evaporated in at least two steps in a separate evaporative reactor (12). In this arrangement, the liquid fuel (38) is first atomized to a fuel vapor/liquid fuel mixture (61) by direct heat exchange with a first heat exchange medium (21) and is instantaneously evaporated in this process. The evaporation of the remaining residue of the liquid fuel (38) then takes place by indirect heat exchange with a second heat exchange medium (51). For this purpose, an evaporative reactor (12) is arranged vertically upstream of the combustion chamber (2) and is connected to it, which evaporative reactor (12) accommodates, at its inlet end, a dual-fluid nozzle (22) connected both to a liquid fuel line (19) and to a supply line (20) for a first heat exchange medium (21).

15 Claims, 3 Drawing Sheets

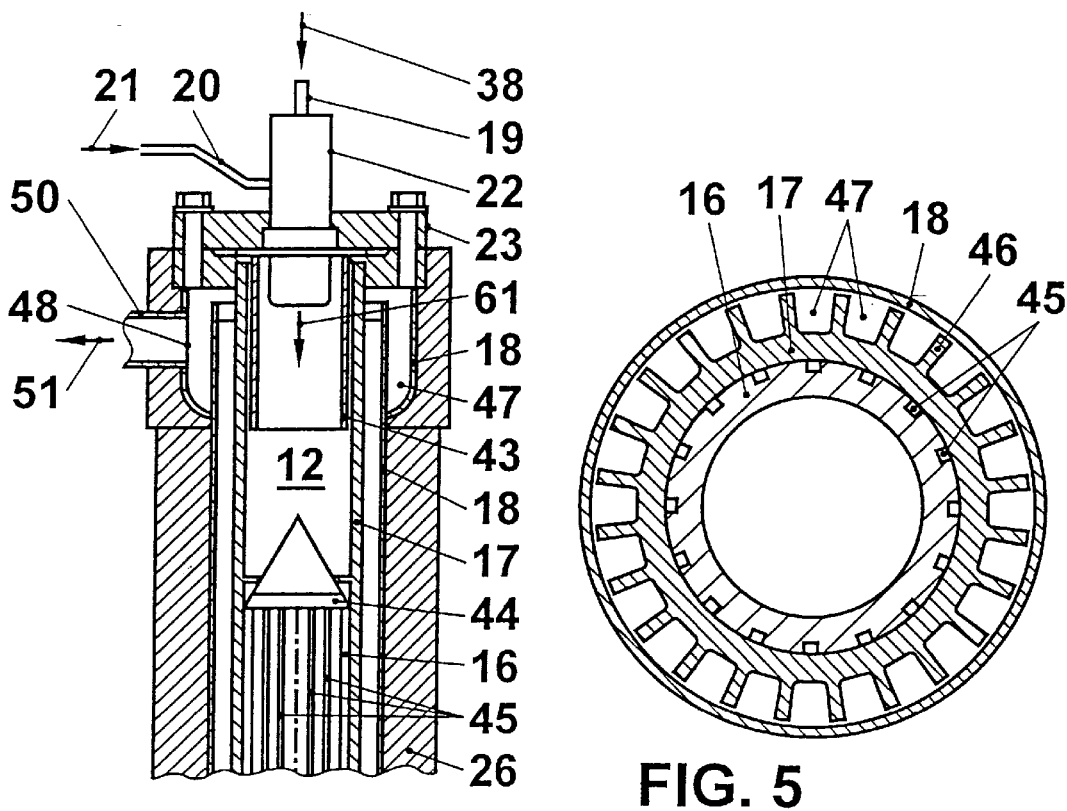
FIG. 5
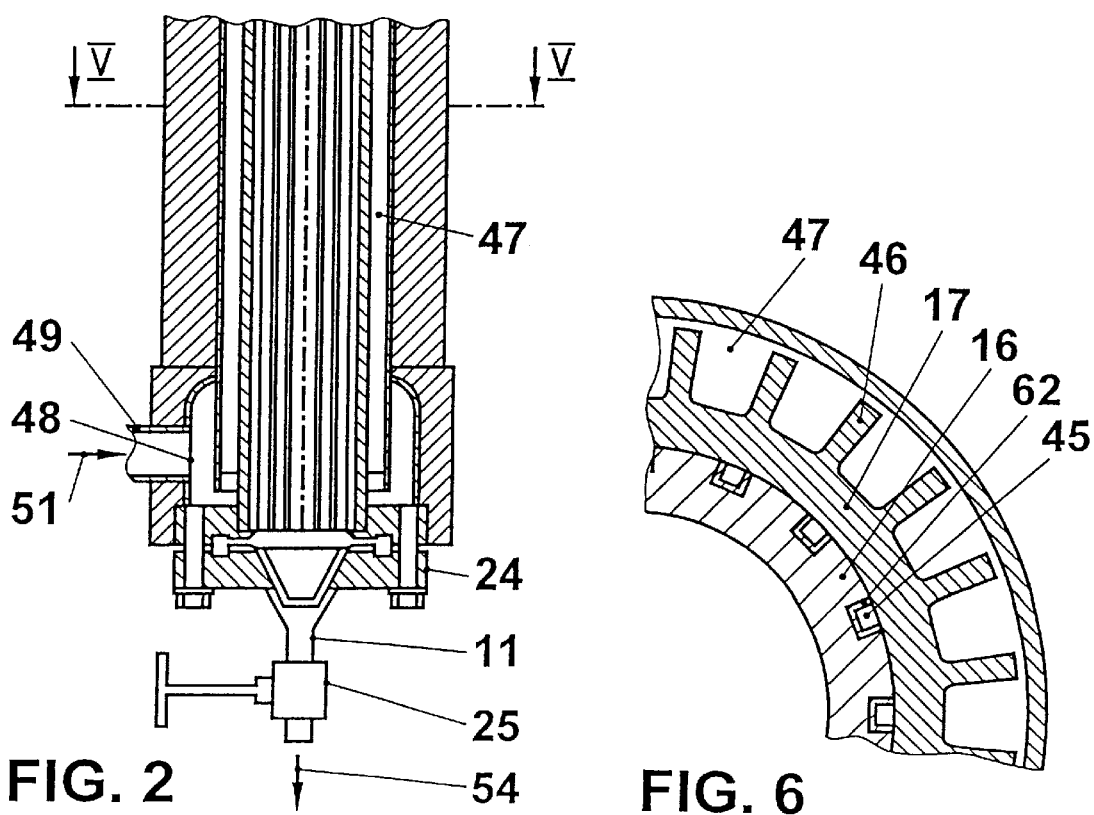
FIG. 2
FIG. 6

METHOD AND APPLIANCE FOR OPERATING A GAS TURBINE INSTALLATION COMBUSTION CHAMBER WITH LIQUID FUEL

FIELD OF THE INVENTION

The invention relates to a method and an appliance for operating a gas turbine installation combustion chamber with liquid fuel.

BACKGROUND OF THE INVENTION

In newer gas turbine installation combustion chambers, weak premixing burners are employed which exhibit particularly low pollutant emissions when operated with gaseous fuels, such as natural gas or methane. Such a burner, designated a double-cone burner, is known from EP-B1 03 21 809. This double-cone burner for operating with either gaseous or liquid fuels has separate fuel lines for the two types of fuel. An atomizing nozzle is also necessary for the liquid fuel. Because it is designed for both types of fuel, the double-cone burner is therefore of larger configuration and is equipped with more components than would be necessary for operation with only one type of fuel.

In the previously known methods and appliances for supplying fuel to a combustion chamber operated with liquid fuels, such as diesel oil or extra-light heating oil, the evaporation of the fuel and the mixing of fuel vapor and combustion air takes place within the burners or the combustion chamber. The evaporating fuel droplets lead to low temperatures on the droplet and in the vicinity of droplets. In addition, inhomogeneous temperature and concentration fields occur in the combustion space because of the evaporating fuel. A wide distribution, which is difficult to control, of the local combustion temperatures and air ratios therefore occurs in the combustion space and this cannot be prevented even with adjustment to average stoichiometry of the combustion pairs. Because, however, the formation of oxides of nitrogen takes place very rapidly at high temperatures and, in contrast, the decomposition reactions of oxides of nitrogen are very much slower, inhomogeneous temperature and concentration fields lead to an increased formation of oxides of nitrogen. Summarizing, it can therefore be stated that the combustion of liquid fuels often results in $NO_X$ figures that are not satisfactorily low because parts of the evaporation and mixing processes take place in parallel, both spatially and in time.

In order to correct this disadvantage, tubes of small diameter are fitted as separate oil evaporation elements in the exhaust gas path of an engine, as described in Förster, S.: "Umweltfreundlicher ÖldampfMotor (Environmentally-friendly oil vapor engine)", in "Berichte des Forschungszentrums Jülich (Reports of the Jülich Research Center)", No. 2564, ISSN 0366-0885, pp. 1–4. This solution, however, requires very large additions of water (in the range of between 2 and 5 kg of water per kg of oil) in order to prevent deposits on the inside walls of the tubes and therefore blockage of them. Because of the high level of water addition and the associated efficiency losses, however, it is not possible to use such evaporation elements for the combustion of liquid fuels in gas turbine installations.

SUMMARY OF THE INVENTION

The invention attempts to avoid all these disadvantages. Its object is based on producing a method for operating a gas turbine installation combustion chamber with liquid fuel, by means of which the $NO_X$ figures obtained are similar to those for gaseous fuels even if cheap liquid fuel is employed. The size of the burners is then also reduced, despite the possibility of employing liquid and gaseous fuels as alternatives. It is also an object of the invention to provide a corresponding appliance for carrying out the method.

This is achieved in accordance with the invention in that, the liquid fuel is evaporated in at least two steps in a separate evaporative reactor located upstream of the combustion chamber. In a first step, the liquid fuel is atomized to a fuel vapor/liquid fuel mixture by direct heat exchange with a first heat exchange medium and, in this process, a part of the liquid fuel is instantaneously evaporated. The second step contains the evaporation of the remaining residue of the liquid fuel by indirect heat exchange with a second heat exchange medium.

Because of its evaporation in the evaporative reactor provided upstream, the original liquid fuel is already gaseous on entering the burners or the combustion chamber and it is therefore possible to dispense with the necessity for fuel evaporation at this location. On entry to the burners, therefore, it is only necessary to effect the mixing of the fuel with the combustion air and, for this reason, the actual combustion of the premixed fuel vapor/air mixture in the combustion chamber can take place substantially more rapidly and with a smaller energy requirement. In addition, the excess air number during the combustion of the prepared liquid fuel vapor can be varied within a range of between 2 and 3.5 because of the high flame extinction limit. In consequence, combustion takes place at a high level of excess air so that the whole of the liquid fuel is burnt. In this way, low pollutant emissions similar to those achieved in the combustion of natural gas can also be achieved when liquid fuels, such as extra-light heating oil or other low boiling point fractions of mineral oil, are used.

It is particularly advantageous to adjust to a temperature equal to or greater than 250° C. during the indirect heat exchange and also to add oxygen. In this way, thermal cracking of the liquid fuel into lighter hydrocarbon fractions and a conversion of saturated into unsaturated hydrocarbons takes place in addition to the evaporation. Furthermore, the indirect heat exchange to the remaining residue of the liquid fuel can take place in the presence of a catalyzer, using, in particular, a catalyzer based on nickel. For this purpose, the displacement unit of the evaporative reactor either possesses a catalytically effective surface layer or is manufactured completely from a catalytically effective material. The evaporation and the cracking of the liquid fuel are therefore supported by catalytic partial cracking.

Because the evaporation of the liquid fuel, the cracking of the hydrocarbons and also the conversion of saturated to unsaturated hydrocarbons are endothermic reactions, the energy required for this purpose is extracted from the second heat exchange medium. This energy is released again in the subsequent combustion in the combustion chamber and the result is therefore an improved gas turbine efficiency. In addition, the reaction rate of the fuel vapor/air mixture is increased because of the cracked and unsaturated hydrocarbons and therefore permits, as compared with natural gas, a wider operating range extending to higher excess air ratios.

It is particularly useful for the oxygen to be introduced into the first heat exchange medium in the form of previously compressed, hot compressor air even before the direct heat exchange, i.e. upstream of the evaporative reactor. The air quantity employed is up to 10%, preferably between 1 and 5%, however, of the quantity required for a stoichiometric combustion reaction. The addition of such a relatively small quantity of air leads to exothermic partial reactions in the fuel vapor/liquid fuel mixture so that its temperature level can be increased by additional heat release. Because of the supply of air which has already taken place upstream of the evaporative reactor, there is a uniform air distribution so that the cracking reactions also take place uniformly in the evaporative reactor.

The quantity of air supplied can he controlled relatively rapidly, as a function of the loading condition of the gas turbine installation, by actuating a control valve provided in a corresponding air line. Apart from improved evaporation of the residual liquid fuel in the evaporative reactor, this also substantially reduces the condensation tendency of the fuel vapor which is produced. Soot formation is practically eliminated because of the presence of the steam. The evaporative reactor is insulated in order to minimize the heat losses.

In order to bring the method into effect, an evaporative reactor connected to the mixing section of the combustion chamber is vertically arranged upstream of this mixing section and this evaporative reactor accommodates at its inlet end a dual-fluid nozzle connected to both a liquid fuel line and a supply Line for a first heat exchange medium. The dual-fluid nozzle consists of a tubular inner body and an outer shell surrounding the inner body. An annular gap is formed between the inner body and the outer shell. The inner body has a central liquid fuel duct and merges into a distributor body downstream. The latter accommodates a plurality of radially directed distributor orifices connected to the liquid fuel duct and opening into the annular gap. An insulating sleeve, which surrounds the inner body and is separated from it by an insulating gap, is located between the connecting piece and the distributor body. The outer shell has a side recess upstream for the supply line of the first heat exchange medium and a nozzle head downstream with a central outlet opening, which diverges as a hollow cone, is connected to the annular gap and leads to the evaporative reactor.

When the installation is operating, the liquid fuel enters centrally into the dual-fluid nozzle of the evaporative reactor and is guided downstream through the inner body. In the distributor body, liquid fuel is introduced in a radially outward direction into the annular gap and therefore into the first heat exchange medium. The insulating sleeve and the insulating gap prevent excessive premature heating to above the evaporation point of the liquid fuel, which could lead to cracking reactions and therefore to deposits on the inner wall of the inner body. The thermal exchange medium breaks up the liquid film and entrains the liquid droplets towards the outlet opening of the dual-fluid nozzle. Because the outlet opening diverges as a hollow cone, the fuel vapor/liquid fuel mixture produced in the dual-fluid nozzle enters the evaporative reactor finely atomized and partially evaporated at a velocity which is in the range of the local sonic velocity. This greatly reduces the tendency to deposit fuel droplets within the dual-fluid nozzle.

The first heat exchange medium is supplied at a mass ratio relative to the liquid fuel of between 0.3 and 1 to 1, preferably at a ratio of 0.5 to 1, while a pressure of between 12 and 40 bar (preferably of between 20 and 30 bar) and a temperature of more than 100° C. above the final boiling temperature of the liquid fuel is maintained in the evaporative reactor. Because the fuel is sprayed in with such a relatively small quantity of superheated steam, the fuel partial pressure can be reduced and therefore, even at these high pressures, the evaporation temperature can be kept at a temperature level at which the heat exchange between the liquid fuel and the hot second heat exchange medium, whose temperature is between 500 and 650° C. can take place in an optimum manner. An instantaneous exchange of heat then takes place between the participating media in and shortly after the dual-fluid nozzle and, in consequence, up to two-thirds of the liquid fuel has already been instantaneously converted to the gaseous phase during the atomization procedure at the inlet to the evaporative reactor. After being sprayed in, the fuel vapor/liquid fuel mixture formed is guided at a high flow velocity through the evaporative reactor, the residence time in the evaporative reactor being up to 30 seconds with a minimum of 1 second. In this way, the liquid fuel still remaining in the fuel vapor/liquid fuel mixture can also be completely evaporated by the indirect heat exchange with hot process exhaust gases from the gas turbine installation. In this process, the enrichment of liquid fuel residues in dead flow zones of the evaporative reactor is prevented by its vertical arrangement.

The evaporative reactor is formed by a displacement unit, a ribbed pressure body and a shell tube. It has a fastening element for the dual-fluid nozzle, a supply line and an exhaust line for a second heat exchange medium and a throttle to reduce the pressure of the resulting fuel vapor. The supply line and the exhaust line for the second heat exchange medium are connected to an annular duct formed between the shell tube and the pressure body. A plurality of evaporation ducts for the fuel vapor/liquid fuel mixture is formed on the periphery of the displacement unit, i.e. between the latter and the pressure body, and they are each arranged substantially parallel to the annular duct for the second heat exchange medium.

The first heat exchange medium consists of superheated steam and the second heat exchange medium consists of a hot process gas from the gas turbine installation, preferably its exhaust gas. It is particularly advantageous for the superheated steam to be supplied from a steam generator connected to the gas turbine installation and for the exhaust gases of the combustion chamber, or of a gas turbine connected to it, to be employed. By this means, intermediate products which are available in any case in the operational process of the gas turbine installation are used so that no external sources are needed for the provision of the heat exchange media.

The liquid fuel is fed at least approximately at right angles into the steam in order to achieve improved mixing between the superheated steam and the liquid fuel in the dual-fluid nozzle, and therefore to have already achieved a higher percentage of fuel vapor at this location. The fuel vapor/liquid fuel mixture produced by this means is accelerated and, as already described above, sprayed at the local sonic velocity into the evaporative reactor. In this way, fluid enrichment (and therefore also the formation of carbon) can be effectively prevented within the dual-fluid nozzle. For this purpose, the distributor orifices open at least approximately at right angles into the dual-fluid nozzle annular duct, which converges continuously downstream. The outlet opening which follows the annular gap is configured in the shape of a Laval nozzle. In addition, a plurality of tangential swirl grooves is provided on the distributor body and these grooves impose a tangential velocity component on the fuel vapor/liquid fuel mixture even before it is sprayed into the evaporative reactor. This likewise improves the mixing of the steam with the liquid fuel and generates an additional shear effect in the flow. In addition, a recirculation sleeve, which at least covers the injection region of the dual-fluid nozzle, is provided in the pressure body of the evaporative reactor. This produces recirculation of the fuel vapor/liquid fuel mixture in this region so that the evaporation procedure can be further accelerated.

It is particularly advantageous for a connecting line, which has a first shut-off valve, to be provided between the evaporative reactor and the combustion chamber. A gas line with a second shut-off valve enters the connecting line downstream of the shut-off valve. During the operation of the gas turbine installation, therefore, it is possible to switch over to liquid fuel or gaseous fuel as required. Because, however, it is invariably only gaseous media which is introduced to the burner or the combustion chamber, whatever the fuel used, only one single distributor and injection system is necessary for the two types of fuel. It is therefore possible to dispense with the liquid fuel and water lines and the liquid fuel nozzles which are provided in the combustion chamber in the case of conventional dual burners; this represents a substantial saving in space and cost.

BRIEF DESCRIPTION OF THE DRAWING

Several embodiment examples of the invention are represented in the drawing, using a gas turbine installation with an appliance for evaporating liquid fuel arranged upstream.

In this,

FIG. 2 shows a longitudinal section through the evaporation appliance of FIG. 1, shown enlarged;

FIG. 5 shows a cross-section through the evaporation appliance along the line V—V in FIG. 2, shown enlarged;

FIG. 6 shows an enlarged representation of FIG. 5 in the region of the evaporator ducts;

Only the elements essential to understanding the invention are shown. Not shown, for example, is the steam turbine connected to the gas turbine installation. The flow directions of the working media are indicated by arrows.

DESCRIPTION OF THE PREFERRED EMBODIMENTS

Figure 1:
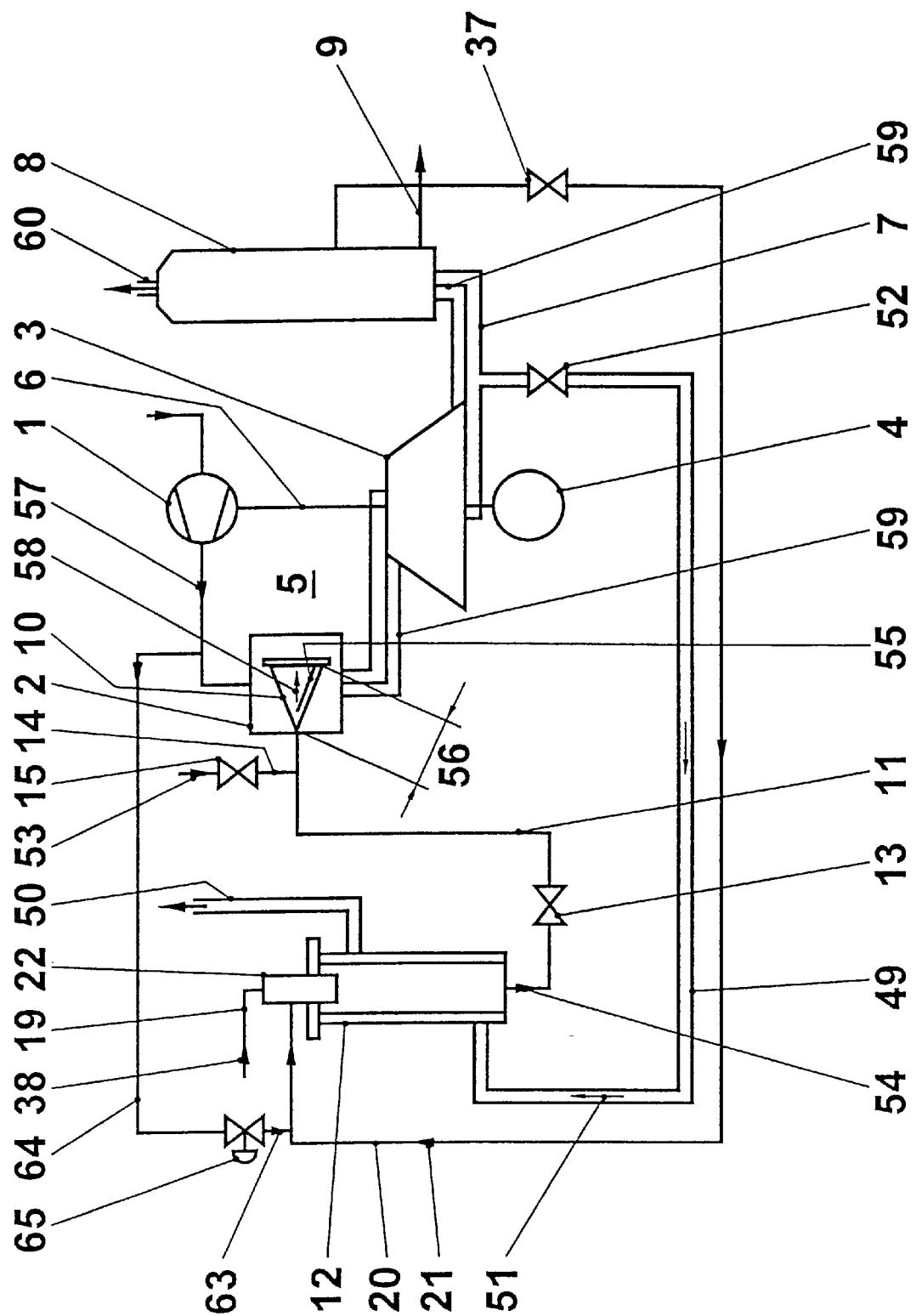
FIG. 1 shows a diagrammatic representation of the gas turbine installation and the evaporation appliance.

A gas turbine installation 5 consisting of a compressor 1, a combustion chamber 2, a gas turbine 3 and a generator 4 is diagrammatically represented in FIG. 1. Both the compressor 1 and the gas turbine 3 and also the generator 4 are arranged on a common shaft 6. At the exhaust gas end, the gas turbine 3 is connected via an exhaust gas duct 7 to a steam generator 8 configured as a waste-heat boiler and this latter is connected via a live steam line 9 to a steam turbine (not shown).

The combustion chamber 2 is equipped with a number of burners 10 which are, in essence, configured like the double-cone burners known from EP-B1 03 21 809 but which have neither liquid fuel lines nor a liquid fuel nozzle. Premixing burners with a similar function can also, of course, be employed. The double-cone burners 10 are connected upstream, via a connecting line 11, to an evaporative reactor 12. A first shut-off valve 13 is arranged in the connecting line 11. A gas line 14 configured as a natural gas line enters the connecting line 11 downstream of the first shut-off valve 13, i.e. between the latter and the combustion chamber 2. The natural gas line 14 has a second shut-off valve 15. The gas turbine installation 5 can also, of course, be operated without the natural gas line 14 or with other suitable burners 10. In addition, it is possible to provide not just one evaporative reactor 12 for the combustion chamber 2 but to connect each burner 10 or at least each group of burners 10 to an evaporative reactor 12.

The vertically arranged evaporative reactor 12 consists of a displacement unit 16, a pressure body 17 and a shell tube 18. At the inlet end, the evaporative reactor 12 accommodates a dual-fluid nozzle 22 which is connected to both a liquid fuel line 19 and a supply line 20 for a first heat exchange medium 21. For this purpose, it has a first fastening element 23 configured as a flange. At the outlet end, this evapo-rative reactor 12 has a second fastening element 24, which is configured in a substantially analogous manner to the first fastening element 23 and to which is connected a throttle 25 and a connecting line 11. The evaporative reactor 12 is coated with an insulating shell 26 consisting of a fibrous ceramic (FIG. 2).

Figure 3:
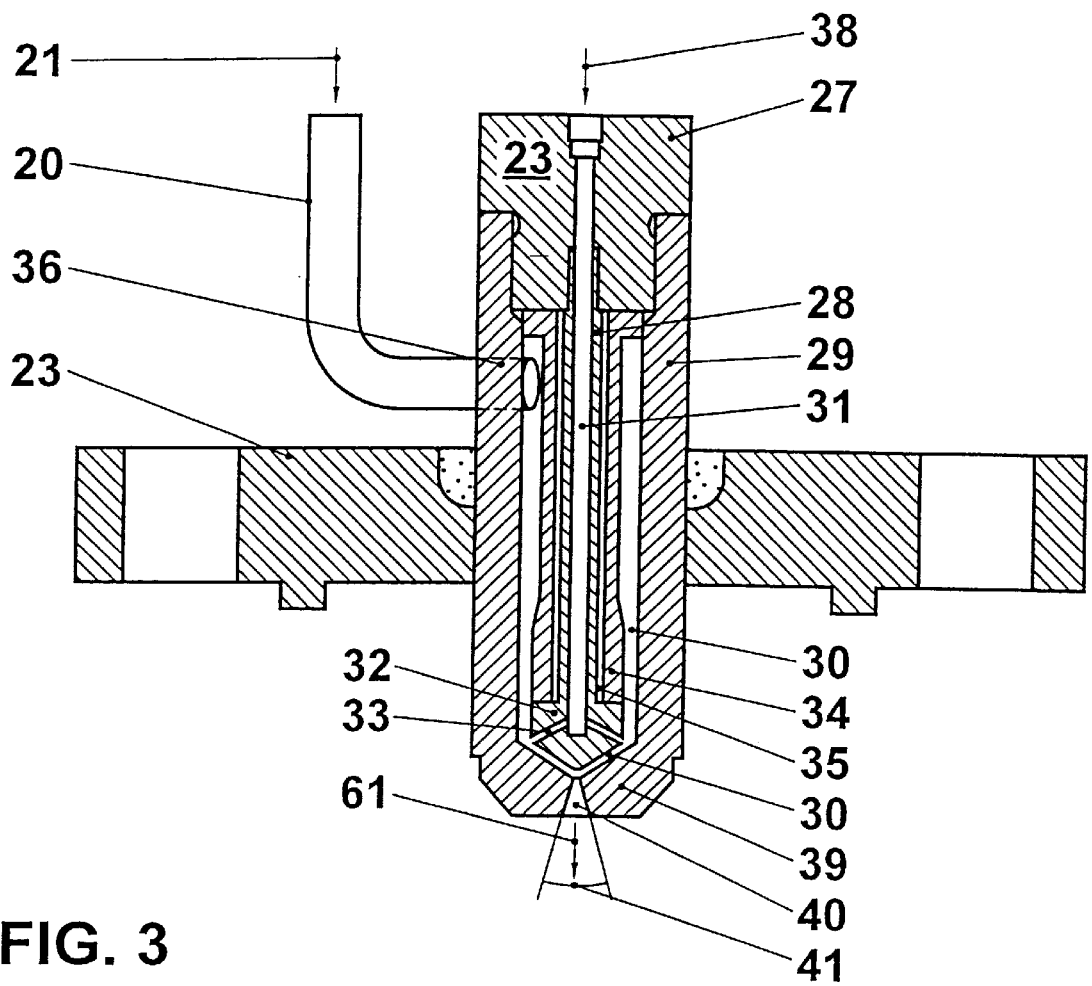
FIG. 3 shows a longitudinal section through the dual-fluid nozzle, shown still further enlarged relative to FIG. 2.

The dual-fluid nozzle 22 consists of a connecting piece 27, a tubular inner body 28 and an outer shell 29 surrounding the inner body 28. An annular gap 30 which continuously converges downstream is configured between the inner body 28 and the outer shell 29. The inner body 28 has a central liquid fuel duct 31 and merges into a distributor body 32 further downstream. The distributor body 32 accommodates a plurality of radially directed distributor orifices 33, which are connected to the liquid fuel duct 31 and open approximately at right angles into the annular gap 30 which continuously converges downstream. An insulating sleeve 34 consisting of ceramic and surrounding the inner body 28 is fastened between the connecting piece 27 and the distributor body 32. This ceramic sleeve 34 is separated from the inner body 28 by an insulating gap 35 (FIG. 3).

Figure 4:
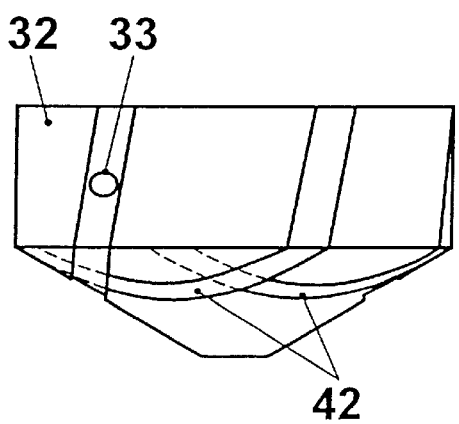
FIG. 4 shows a representation of the swirl grooves formed on the inside of the nozzle.

The outer shell 29 of the dual-fluid nozzle 22 has, at its upstream end, a side recess 36 for the supply line 20 connected to the waste-heat boiler 8. Superheated steam from the waste-heat boiler 8 is supplied as the first heat exchange medium 21 to the liquid fuel 38 through this supply line 20, which is provided with a third shut-off valve 37 (FIG. 1). Other suitable fluids, such as hot nitrogen at over 500° C., can likewise be employed as the first heat exchange medium 21. At its downstream end, the outer shell 29 merges into a nozzle head 39 which has a central outlet opening 40 leading to the evaporative reactor 12, this outlet opening 40 diverging in the shape of a hollow cone and being connected to the annular gap 30. The outlet opening 40 defines an opening angle 41 of approximately 20° (FIG. 3). In addition, a plurality of tangential swirl grooves 42 are formed on the outer surface of the distributor body 32, i.e. in the annular gap 30 between the nozzle head 39 and the distributor body 32 (FIG. 4).

Fastened at the inlet end of the pressure body 17 of the evaporative reactor 12 is a recirculation sleeve 43 which at least covers the injection region of the dual-fluid nozzle 22. Following on from this, there is a guide cone 44 connected to the displacement unit 16 (FIG. 2). A plurality of evaporation ducts 45 are shaped out from the periphery of the displacement unit 16, i.e. between the latter and the pressure body 17. The pressure body 17, which is at a distance from the shell tube 18, has outwardly directed ribs 46. An annular duct 47 is formed between the shell tube 18, on the one hand, and the pressure body 17 and its ribs 46, on the other (FIG. 5). In both its lower and upper regions, the shell tube 18 has openings 48 for a feed line 49 and an outlet line 50 of a second heat exchange medium 51. The feed line 49, which is provided with a fourth shut-off valve 52, branches off from the exhaust gas line 7 upstream of the waste-heat boiler 8 so that exhaust gas from the gas turbine 3 is employed as the second heat exchange medium 51 (FIG. 1). Any other hot inert gas with a temperature of more than 550° C. is likewise suitable as the second heat exchange medium 51, for example hot combustion air. On the other hand, the outlet line 50 is connected to a chimney (not shown).

The gas turbine installation 5 can be operated with either fuel oil, used as the liquid fuel 38, or natural gas 53 depending on whether the shut-off valve 13, 15 located in the connecting line 11 or in the natural gas line 14 is open. In any event, however, a gaseous fuel is supplied to the double-cone burners 10. This is either the natural gas 53 flowing in from the gas line 14 or the fuel vapor 54 produced from the fuel oil 38 in the dual-fluid nozzle 22 and in the evaporative reactor 12. In addition to fuel oil 38, it is of course also possible for other liquid fuels with boiling temperatures less than or equal to 450° C. to be used. Liquid fuels 38 with higher boiling temperatures are not employed because of the associated danger of coking.

In the double-cone burners 10, combustion air 57, which has previously been compressed from ambient air in the compressor 1, is mixed in along a mixing section 56 by means of tangential air inlet slots 55 only indicated diagrammatically in FIG. 1. This forms a combustion mixture 58 which is burned in the combustion chamber 2. Combustion gases 59, which are guided into the gas turbine 3 and expanded in it, are produced during the combustion. By this means, the compressor 1 and the generator 4 arranged on one shaft 6 with the gas turbine 3 are driven simultaneously, the purpose of the generator being the generation of electricity. The expanded and still hot combustion gases 59 are guided via the exhaust gas line 7 into the waste-heat boiler 8 and there used to generate superheated steam. This steam is supplied via the live steam line 9 to the steam turbine (not shown). The combustion gases 59 are subsequently exhausted to the environment by a chimney 60. When natural gas 53 is used, the shut-off valves 13, 37 and 52 provided in the connecting line 11, the supply line 20 and the feed line 49 are closed.

If, on the other hand, fuel oil 38 is to be employed for operating the gas turbine installation 5, the shut-off valves 13, 37 and 52 are opened and the supply of natural gas 53 is prevented by closing the second shut-off valve 15 provided in the gas line 14. In this case, superheated steam 21 is taken from the waste-heat boiler 8 in a mass ratio of 0.5 to 1 kg/kg of the fuel oil 38 used and the superheated steam 21 is supplied to the dual-fluid nozzle 22 via the supply line 20 at a pressure of approximately 30 bar and at a temperature of approximately 500 to 650° C., i.e. more than 100° C. above the final boiling temperature of the fuel oil 38.

The fuel oil 38 reaches the dual-fluid nozzle 22 via the liquid fuel line 19. In order to improve the atomization, i.e. to reduce its viscosity, the fuel oil 38. can be preheated with the residual heat of the second heat exchange medium 51 by means of a connecting line (not shown) between the liquid fuel line 19 and the outlet line 50. Within the dual-fluid nozzle 22, the centrally entering fuel oil 38 is driven downstream by the fuel pressure in the liquid fuel duct 31. In this region, the ceramic sleeve 34 and the insulating gap 35 prevent premature heating of the fuel oil 38 due to heat transfer from the superheated steam 21. Cracking reactions of the fuel oil 38 and therefore deposits on the inner wall of the inner body 28 can be avoided in this way (FIG. 3).

The fuel oil 38 finally enters, approximately at right angles, through the distributor orifices 33 into the continuously converging annular gap 30 which is filled with superheated steam 21. This produces an instantaneous transfer of heat from the steam 21 to the fuel 38 so that a major part of the fuel oil 38 has already been converted into the gaseous phase. In addition, an intensive mixing of the participating media to form a fuel vapor/liquid fuel mixture 61 is achieved and this is further reinforced by the tangential swirl grooves 42. In this process, the steam 21 acts as transport, atomization and evaporation agent.

It is, of course, also possible for the superheated steam 21 to be fed centrally and the fuel oil 38 to be fed, coaxially with it, into a correspondingly designed dual-fluid nozzle 22. In this case (which is not shown), no cracking reactions of the fuel oil 38 are to be feared, so that it is possible to dispense with the ceramic sleeve 34 arrangement.

Because the outlet opening 40 diverges in the shape of a hollow cone, the fuel vapor/liquid fuel mixture 61 enters the pressure body 17 of the evaporative reactor 12 with local sonic velocity. This greatly reduces the tendency to deposit fuel droplets within the dual-fluid nozzle 22 and, in particular, in the region of the outlet opening 40 of it. The recirculation sleeve 43 provided in the pressure body 17 in the injection region of the dual-fluid nozzle 22 causes local recirculation of the fuel vapor/liquid fuel mixture 61 and this supports the evaporation of the residual fuel oil 38.

The fuel vapor/liquid fuel mixture 61 is subsequently guided via the guide cone 44 to the evaporation ducts 45. The evaporation of the residual fuel oil 38 takes place in the evaporation ducts 45, i.e. in the space left free, because of the indirect heat exchange with the exhaust gases 51 of the gas turbine 3 flowing in counterflow principle through the annular duct 47. In this way, the fuel oil 38 still remaining in the fuel vapor/liquid fuel mixture 61 can also be completely converted into fuel vapor 54 in indirect heat exchange with the exhaust gases 51 of the gas turbine 3. For this purpose, the fuel vapor/liquid fuel mixture 61 is guided, after being sprayed into the pressure body 17, at a high flow velocity through the evaporative reactor 12 with a residence time in the evaporative reactor 12 of at least one second. Finally, the resulting fuel vapor 54 is further guided to combustion in the combustion chamber 2, the throttle 25 being used for pressure reduction.

In addition, the displacement unit 16 has a catalytically effective surface layer 62, for which purpose a catalyzer based on nickel is used (FIG. 6). By this means, the second evaporation step of the fuel oil 38 is supported by catalytic partial cracking and this both intensifies the formation of low boiling point hydrocarbons and minimizes the formation of soot. For the same purpose, the displacement unit 16 can also be manufactured completely from a catalytically effective material.

The evaporative reactor 12 can, of course, also be designed without a displacement unit 16, and the guide cone 44 connected to it (not shown). Given adequate heat transfer to the liquid fuel 38, this permits a reduction in the dimensions of the evaporative reactor 12.

The insulating shell 26 minimizes the heat losses from the whole of the evaporative reactor 12. Similarly, the most sensitive pipework can be protected from excessive heat losses by commercial insulating materials (not shown).

The volume of the evaporative reactor 12, together with the residence time and therefore, indirectly, the evaporation performance, can be influenced by varying the dimensions of the displacement unit 16 installed. The supply of the two heat exchange media 21 and 51 employed can also, of course, take place from external sources (likewise not shown).

The exhaust gas figures measured in a gas turbine installation 5 designed in accordance with the embodiment example described are compared in the following table with the corresponding exhaust gas figures from a reference installation without preliminary evaporation of the fuel oil 38 (estimated figures).

| Fuel | Reference installation without preliminary evaporation (estimated figures) EL (extra-light) fuel oil | Embodiment example with preliminary evaporation (measured figures) EL (extra-light) fuel oil |
|---|---|---|
| Calorific value [MJ/kg] | 42.4 | 42.4 |
| Nitrogen content [mg/kg] | 124 | 124 |
| Evaporation: | | |
| Power [KW] | not applicable | 100 |
| Operating temperature [K.] | not applicable | 780 |
| Operating pressure [bar] | not applicable | 30 |
| Water/oil [kg/kg] | not applicable | 0.5 |
| Air addition | not applicable | 0 |
| Combustion: | | |
| Power [KW] | 100 | 100 |
| Operating temperature [K.] | 1800 | 1800 |
| Operating pressure [bar] | 20 | 20 |
| Water/oil [kg/kg] | 1 | 0.5 |
| Excess air number 1 | 2 | 2 |
| $NO_x$ [ppm] | 42 | 11 |
| CO [ppm] | 10 | 1 |
| UHC [ppm] | 5 | 1 |

From this, it may be concluded that in addition to a marked reduction in the $NO_x$ figures, there is also a reduction in the proportions of carbon monoxide and of unburned hydrocarbons in the exhaust gas of the gas turbine installation 5.

In a second embodiment, tapped compressor air 63, and with this a proportion of oxygen, is introduced into the superheated steam 21 upstream of the evaporative reactor 12. For this purpose, an air line 64 enters the supply line 20. The air quantity employed is approximately 5% of the quantity required for a stoichiometric reaction. Supply of such a relatively small air quantity produces partial reactions in the evaporative reactor 12 so that its temperature level can be increased on the basis of the additional heat released. In addition to improved evaporation of the residual fuel oil 38 in the evaporative reactor 12, this also markedly reduces the condensation tendency of the fuel vapor 54 which is produced. By means of an appropriate control of the air supply, the temperature in the evaporative reactor 12 can, of course, be matched relatively rapidly to a possible change in the load on the gas turbine installation 5. For this purpose, a control valve 65 is provided in the air line 64 (FIG. 1).

Figure 7:
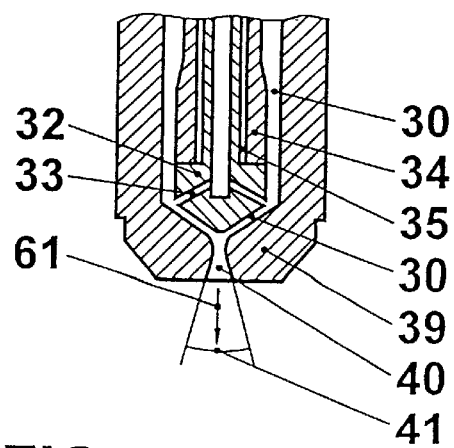
FIG. 7 shows a representation of the nozzle of FIG. 3 but with a different outlet opening.

In a third embodiment example, the outlet opening 40 from the dual-fluid nozzle 22 to the evaporative reactor 12 is designed in the shape of a Laval nozzle (FIG. 7). The spraying velocity of the fuel vapor/liquid fuel mixture 61 into the pressure body 17 of the evaporative reactor 12 is further increased by this means so that powerful flow turbulence is generated immediately downstream of the outlet opening 40. The result of this is improved mixing and evaporation of the fuel oil 38 and it also effectively prevents any deposition of droplets in the outlet opening 40.

| LIST OF DESIGNATIONS | |
|---|---|
| 1 | Compressor |
| 2 | Combustion chamber |
| 3 | Gas turbine |
| 4 | Generator |
| 5 | Gas turbine installation |
| 6 | Shaft |
| 7 | Exhaust duct |
| 8 | Steam generator, waste-heat boiler |
| 9 | Live steam line |
| 10 | Burner, double-cone burner |
| 11 | Connecting line |
| 12 | Evaporative reactor |
| 13 | Shut-off valve, first |
| 14 | Gas line, natural gas line |
| 15 | Shut-off valve, second |
| 16 | Displacement unit |
| 17 | Pressure body |
| 18 | Shell tube |
| 19 | Liquid fuel line |
| 20 | Supply line |
| 21 | First heat exchange medium, steam |
| 22 | Dual-fluid nozzle |
| 23 | First fastening element, flange |
| 24 | Second fastening element |
| 25 | Throttle |
| 26 | Insulating shell |
| 27 | Connecting piece |
| 28 | Inner body |
| 29 | Outer shell |
| 30 | Annular gap |
| 31 | Liquid fuel duct |
| 32 | Distributor body |
| 33 | Distributor orifice |
| 34 | Insulating sleeve, ceramic sleeve |
| 35 | Insulating gap |
| 36 | Recess |
| 37 | Shut-off valve, third |
| 38 | Liquid fuel, fuel oil |
| 39 | Nozzle head |
| 40 | Outlet opening |
| 41 | Opening angle |
| 42 | Swirl groove |
| 43 | Recirculation sleeve |
| 44 | Guide cone |
| 45 | Evaporator duct |
| 46 | Rib, of 17 |
| 47 | Annular duct |
| 48 | Opening |
| 49 | Feed line |
| 50 | Outlet line |
| 51 | Second heat exchange medium, exhaust gas |
| 52 | Shut-off valve, fourth |
| 53 | Natural gas |
| 54 | Fuel vapor |
| 55 | Air inlet slot, tangential |
| 56 | Mixing section |
| 57 | Combustion air, compressed ambient air |
| 58 | Combustion mixture |
| 59 | Combustion gas |
| 60 | Chimney |
| 61 | Fuel vapor/liquid fuel mixture |
| 62 | Surface layer, catalyzer |
| 63 | Oxygen, compressor air |
| 64 | Air line |
| 65 | Control valve |

What is claimed as new and desired to be secured by Letters Patent of the United States is:

1. A method for operating a gas turbine installation combustion chamber with liquid fuel having a boiling temperature less than or equal to 40° C., comprising the steps of:

evaporating the liquid fuel to form a fuel vapor;
mixing the fuel vapor with combustion air in a mixing section to form a combustion mixture; and igniting the combustion mixture;

wherein the step of evaporating the liquid fuel is performed separately in space and time from the step of mixing the fuel vapor with the combustion air; and wherein the step of evaporating, the liquid fuel comprises evaporating in at least two steps in a separate evaporative reactor, a first step comprising atomizing the liquid fuel to a fuel vapor/liquid fuel mixture by direct heat exchange with a first heat exchange medium, a part of the liquid fuel being instantaneously evaporated in the first step and a part of the liquid fuel remaining as a residue and, subsequently, a second step comprising evaporating the residue of the liquid fuel by indirect heat exchange with a second heat exchange medium.

2. The method as claimed in claim 1, wherein the indirect heat exchange is performed at a temperature greater than or equal to 250° C. and wherein said evaporating step further comprises adding oxygen.

3. The method as claimed in claim 2, wherein the step of adding oxygen comprises adding compressed air including oxygen into the first heat exchange medium before the direct heat exchange, an air quantity of up to 10% of the quantity required for a stoichiometric combustion reaction being added.

4. The method as claimed in claim 3, comprising controlling the quantity of compressed air as a function of the loading condition of the gas turbine installation.

5. The method as claimed in claim 1, wherein the second step of evaporating the residue of the liquid fuel, by indirect heat exchange comprises evaporating in the presence of a catalyzer.

6. The method as claimed in claim 1, wherein the first heat exchange medium comprises superheated steam and the second heat exchange medium comprises a hot process gas from the gas turbine installation.

7. The method as claimed in claim 6, further comprising supplying the first heat exchange medium from a steam generator connected to the gas turbine installation and supplying the second heat exchange medium from a gas turbine of the gas turbine installation.

8. The method as claimed in claim 7, wherein the step of supplying the first heat exchange medium comprises supplying at a mass ratio relative to the liquid fuel of between 0-3 and 1 to 1, a pressure of between 12 and 40 bar, and maintaining a temperature of more than 100° C. above the boiling temperature of the liquid fuel in the evaporative reactor, and the resulting fuel vapor/liquid fuel mixture has a residence time in the evaporative reactor of between 1 and 30 seconds.

9. The method as claimed in claim 8, wherein the first step of the evaporating step comprises introducing the liquid fuel approximately at right angles into the first heat exchange medium to form a fuel vapor/liquid fuel mixture, and accelerating and spraying the fuel vapor/liquid fuel mixture with local sonic velocity into the evaporative reactor.

10. The method as claimed in claim 9, further comprising imposing a tangential velocity component on the fuel vapor/liquid fuel mixture before the step of spraying into the evaporative reactor.

11. The method as claimed in claim 3, wherein the air quantity is between 1% and 5% of the quantity required for a stoichiometric combustion reaction.

12. The method as claimed in claim 5, wherein the catalyzer is based on nickel.

13. The method as claimed in claim 6, wherein the hot process gas is exhaust gas from the gas turbine installation.

14. The method as claimed in claim 8, wherein the mass ratio relative to the liquid fuel is 0.5 to 1.

15. The method as claimed in claim 8, wherein the pressure is between 20 and 30 bar.

* * * * *